May 14, 1968   G. A. TINNERMAN   3,382,753
SPRING STEEL FASTENERS

Filed Sept. 20, 1965   2 Sheets-Sheet 1

INVENTOR.
GEORGE A. TINNERMAN
BY
ATTORNEY

May 14, 1968  G. A. TINNERMAN  3,382,753
SPRING STEEL FASTENERS
Filed Sept. 20, 1965  2 Sheets-Sheet 2

INVENTOR.
GEORGE A. TINNERMAN
BY
ATTORNEY

United States Patent Office 3,382,753
Patented May 14, 1968

3,382,753
SPRING STEEL FASTENERS
George A. Tinnerman, 17864 Beach Road,
Lakewood, Ohio 44107
Filed Sept. 20, 1965, Ser. No. 489,467
3 Claims. (Cl. 85—32)

ABSTRACT OF THE DISCLOSURE

A fastener in the nature of a nut formed from spring sheet material having a stud receiving passage formed in an integral base, and having stud engaging and supporting portions formed on the base to maintain proper alignment with the stud during assembly of the nut thereon.

This invention relates to fasteners and more particularly to fasteners which may be fashioned from spring sheet material such as steel, and which is provided with an integral base and stud engaging and supporting portions to maintain proper alignment with and during assembly on a stud. The forms of the invention disclosed herein constitute improvements over my allowed copending application, Ser. No. 204,889, filed June 25, 1962, now Patent No. 3,207,022.

In the past, spring steel fasteners constituted a base in the form of a flat or arched spring washer surrounding opposed prongs inclined upwardly from the base and toward one another with their free ends spaced apart for the passage of a stud shank between them to be gripped thereby to provide a complete fastener eliminating separate parts such as a lock washer or the like.

The present invention relates to improved types of such fasteners in which, by virtue of the unique related structural characteristics employed, the full strength of the base of the fastener, as well as the stud engaging portions are utilized to effectively resist flattening of the prongs under higher thrust load and to insure against the possibility of misapplication to a stud, whether threaded or unthreaded.

By this invention, as illustrated and described in the several embodiments herein, in the application of the fastener to a threaded or unthreaded stud, the radial and circumferential thrusts applied against the stud are so distributed about the axis of the stud that alignment of the fastener with the stud is maintained even under extreme applications of torque. Thus the danger of damage to the fastener and/or to the stud during application is reduced to a minimum even under extreme tensile pull.

The invention will be clearly understood by reference to the following detailed specification of several embodiments and the accompanying drawings.

Figure 1:
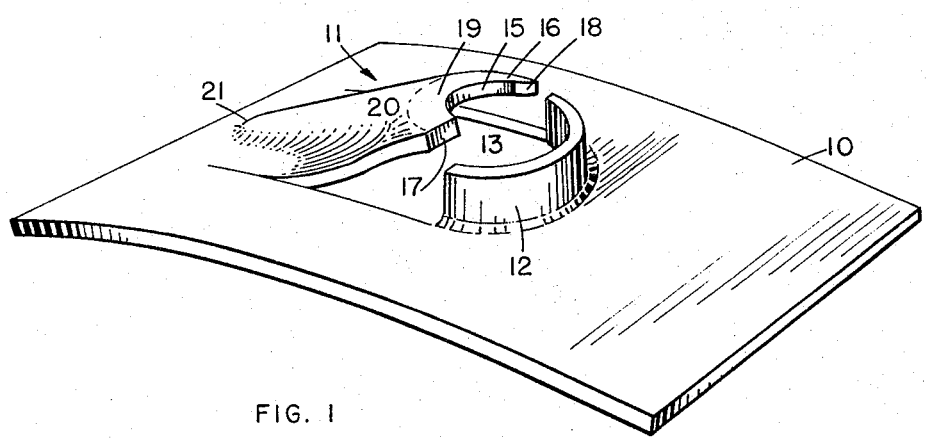
Figure 2:
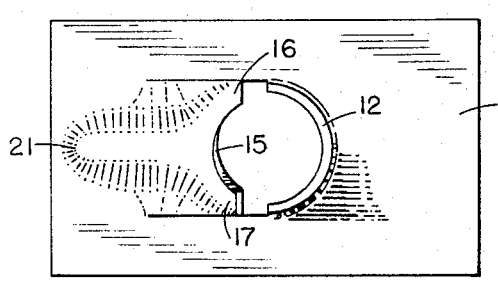
Figure 3:
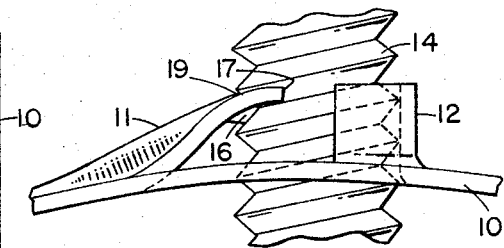
Figure 4:
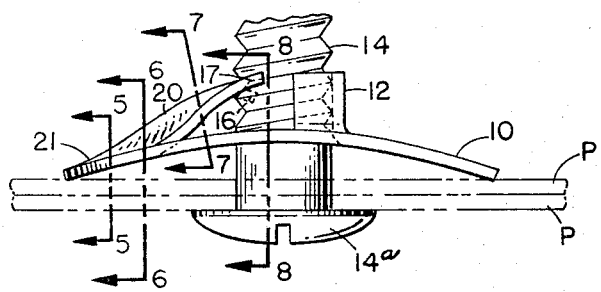
Figure 8:
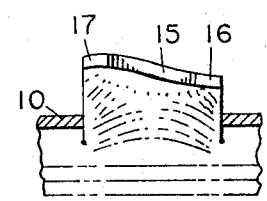
Figure 5:
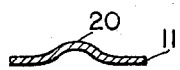
Figure 6:
Figure 7:
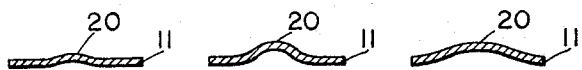
Figure 9:
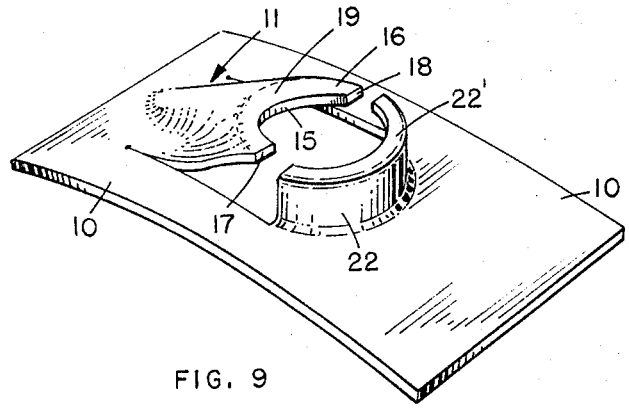
Figure 10:
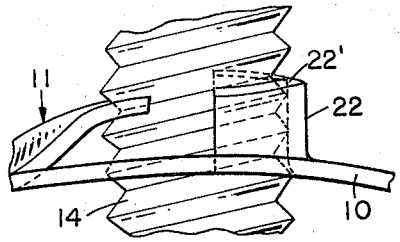
Figure 11:
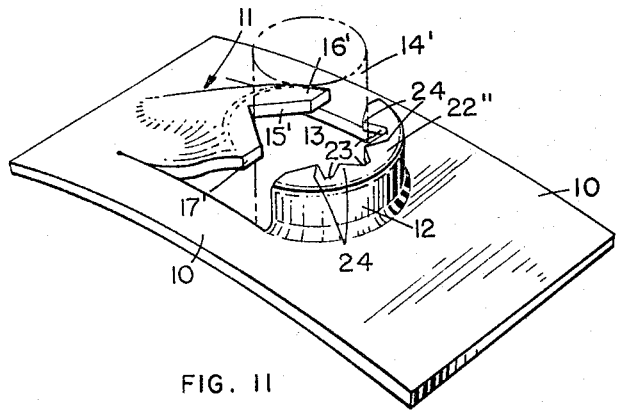
Figure 12:
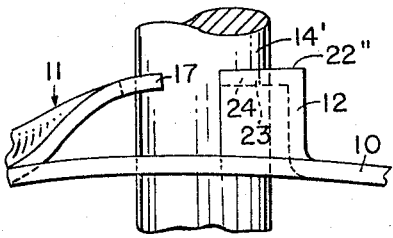

In the drawings:
FIGURE 1 is an enlarged perspective view of a fastener illustrating one embodiment of the invention;
FIGURE 2 is a top plan view in reduced form of the fastener shown in FIGURE 1;
FIGURE 3 is a fragmentary side elevation of the fastener shown in FIGURE 1 showing the same applied to a threaded stud;
FIGURE 4 shows this embodiment applied in use;
FIGURES 5, 6, 7 and 8, respectively, are sections taken on lines 5—5, 6—6, 7—7 and 8—8 of FIGURE 4;
FIGURE 9 is a perspective view, slightly enlarged, of a second embodiment of the invention;
FIGURE 10 is a fragmentary side elevation of the fastener shown in FIGURE 9 as applied to a threaded stud;
FIGURE 11 is a perspective view of a third embodiment of the invention;
FIGURE 12 is a fragmentary side view of the embodiment of FIGURE 11;

Referring more specifically to FIGURES 1–8 of the drawings, 10 indicates the arched rectangular base of the fastener formed of spring steel sheet from which a tongue 11 and a collar portion 12 are struck upwardly, providing therebetween a main aperture or passage 13 for the passage of a threaded headed stud 14. The tongue 11 terminates at one end in a recessed portion 15 on opposite sides of which are spaced the thread-engaging prongs 16 and 17 which are offset relatively to one another from a common plane to provide, in effect, a spiralling thread-engaging edge. The thread-engaging lead prong 16 is bent and curved inwardly in a direction toward the base to form at its outer surface a curved thread-engaging bearing surface 18 which leads the prong 16 into braking engagement with the thread at the base of the root of the stud.

The tongue 11 is outwardly concaved or crowned from its inner surface to form a rigidifying crown 19 surrounding the recess 15 and is formed with an outwardly rising longitudinal rib 20 which flares laterally to merge with the crown 19 and tapers rearwardly and extends to a terminal end 21 in the base 10 at a point substantially beyond the line of juncture of the tongue and the base, thus forming a rigidifying bridge extending substantially from an end of the base to the terminal open end of the tongue.

The collar 12 extends outwardly and perpendicular of the base at its point of juncture therewith and is of a height at least equal to that of the free open end of the tongue 11 above the base. As illustrated in FIGURES 3 and 4, it will be noted that the shank of the threaded stud 14, which is headed as at 14', passes through an aperture in the piece or pieces P to which the fastener is applied, and its threaded portion extends into and through the passage 13 in the fastener in such manner that upon initial engagement of the prongs with the thread of the stud and upon turning the stud in the proper direction by means of a tool (not shown) engaging the stud head, the prongs will bear against the respective walls at the root of the thread. As disclosed in my copending application above referred to, the strength of the reinforced tongue which stems initially from the base 10, and the increased strengthening effect being supplemented through the rib 20 and the crown 19 is such that the fastener as a whole utilizes the previously unused strength of the base of a fastener of this general character. Such structure has the exect of greatly increasing the strength characteristics of the fastener.

According to the present form of the invention, the collar 12 is rigid, being curved laterally of the base in partial circular form and upon a radius suitable and compatible with the outer diameter of the threaded stud to which the fastener is applied.

This collar, having a smooth inner thread-engaging surface preferably extends to a height above the base 10 to approximately that of the prongs 16 and 17, and forms a rigid means by which the axis of the stud may be maintained in proper vertical alignment during the application of the fastener to a part or parts to be clamped and throughout the application of torque in securing the fastener. The cooperation of the collar with the prongs in maintaining alignment of the stud during application of torque to the stud is such that initial misapplication of the fastener to the stud is prevented, while the full utilization of the increased strength characteristics of the base and tongue is assured without damage to the stud or the fastener.

Referring now to FIGURES 9 and 10, a modified form of the embodiment just described, is illustrated in which the rigid collar 22 terminates at its top in a continuous inturned helically disposed flange portion 22' for bearing engagement with the root of the thread opposite the tongue 11 with its prongs 16 and 17 also having bearing engagement with the thread of the stud.

In FIGURES 11 and 12, there is illustrated an embodiment of the invention which is particularly adapted for push-on application to an unthreaded stud, rod or the like, indicated at 14'. In this form, the necessity of offsetting the prongs 16' and 17' in a spiral or helical direction is obviated. The tongue 11, in other respects, is similar to that illustrated in the forms previously described, except that the crown of the tongue is formed with a V-notch 15' opening outwardly to receive and locate the rod or other unthreaded member 14' in the opening 13, rather than a recess such as 15. Cooperating with the tongue is a rigid collar 12 disposed opposite the tongue 11. In this form the collar terminates at its top in an inturned flange-like portion 22" lying in a plane perpendicular to the axis of the collar and to the axis of the rod 14'. This flange portion is notched at spaced intervals, as at 23, forming between the notches the teeth 24 which are disposed for bearing engagement against the rod.

The foregoing description and accompanying drawings are considered as illustrative only of the principles of the invention and the spring steel fastener of the present invention is not to be regarded as limited by the above described embodiments. Alternative arrangements of parts, substitution of materials and other organization and assembly procedures, apparent to those skilled in the art, may be employed without departing from the scope and spirit of the invention as claimed.

What I claim is:

1. A spring steel nut comprising a base, said base having a pair of opposed stud engaging members struck therefrom, at least one of said members severed from the base along its sides and integral with the base only at its end opposite its free end, said severed member inclining outwardly from the base toward the other of said members, said members terminating in spaced apart recessed free ends to form a passage therebetween for a stud to be engaged thereby, said member severed from the base constituting a tongue outwardly crowned to form a rigidifying crown partially surrounding the recess and extending completely across the free end of the tongue, said tongue flaring laterally thereof and merging with an outwardly rising longitudinal rib formed in the tongue and extending therefrom into the base substantially beyond the line of juncture of the base with the tongue to form a rigidifying bridge extending from the base to the terminal end of the tongue, the other of said struck members comprising a collar of arcuate form extending perpendicular from the base and having an internal radius compatible with that of a stud in said passage and a plurality of inwardly disposed prongs formed on the collar at the free end thereof for engagement with a stud in said passage whereby to maintain the stud in alignment during application of torque to the stud.

2. A spring steel nut comprising a base, said base having a pair of opposed stud engaging members struck therefrom, at least one of said members severed from the base along its sides and integral with the base only at its end opposite its free end, said severed member inclining outwardly from the base toward the other of said members, said members terminating in spaced apart recessed free ends to form a passage therebetween for a stud to be engaged thereby, said member severed from the base constituting a tongue outwardly crowned to form a rigidifying crown partially surrounding the recess and extending completely across the free end of the tongue, said tongue flaring laterally thereof and merging with an outwardly rising longitudinal rib formed in the tongue and extending therefrom into the base substantially beyond the line of juncture of the base with the tongue to form a rigidifying bridge extending from the base to the terminal end of the tongue, the other of said struck members comprising a collar of arcuate form extending perpendicular from the base and having an internal radius compatible with that of a stud in said passage, and a helically inclined flange extending from the collar at the free end thereof and into and engaging the root of the thread of a threaded stud in said passage.

3. A spring steel nut comprising a base, said base having a pair of opposed stud engaging members struck therefrom, at least one of said members severed from the base along its sides and integral with the base only at its end opposite its free end, said severed member inclining outwardly from the base toward the other of said members, said members terminating in spaced apart recessed free ends to form a passage therebetween for a stud to be engaged thereby, said member severed from the base constituting a tongue outwardly formed with the area surrounding the said recessed free end and helically inclined to extend into and engage the root of the thread of a threaded stud in the passage, the other of said struck members comprising a collar of arcuate form extending perpendicular from the base and having an internal radius compatible with that of a stud in said passage, and a helically inclined flange extending from the collar at the free end thereof and into and engaging the root of the thread of a threaded stud in said passage.

References Cited
UNITED STATES PATENTS

| | | | |
|---|---|---|---|
| 2,062,685 | 12/1936 | Tinnerman | 151—41.75 |
| 2,070,005 | 2/1937 | Dom et al. | 85—36 |
| 2,260,147 | 10/1941 | Lundberg et al. | 85—36 |
| 2,389,261 | 11/1945 | Lang | 85—32 |
| 3,207,022 | 9/1965 | Tinnerman | 85—36 |

MARION PARSONS, JR., *Primary Examiner.*